(12) United States Patent
Shiomi et al.

(10) Patent No.: US 6,226,104 B1
(45) Date of Patent: May 1, 2001

(54) METHOD AND APPARATUS FOR RECORDING HALFTONE IMAGE UTILIZING TONE REPRODUCTION AT EACH PIXEL

(75) Inventors: Junichi Shiomi; Takahide Hirawa, both of Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 0 days.

(21) Appl. No.: 09/157,520

(22) Filed: Sep. 21, 1998

(30) Foreign Application Priority Data

Sep. 24, 1997 (JP) .................................................. 9-278128

(51) Int. Cl.$^7$ ...................................................... H04N 1/40
(52) U.S. Cl. ......................... 358/1.9; 358/456; 358/457; 358/298; 382/237
(58) Field of Search ..................................... 358/455, 456, 358/457, 458, 459, 534, 535, 536, 1.9, 298; 382/237

(56) References Cited

U.S. PATENT DOCUMENTS

| | | | |
|---|---|---|---|
| 5,237,650 | * 8/1993 | Priem et al. | 345/443 |
| 5,361,084 | 11/1994 | Paton et al. | |
| 5,712,711 | * 1/1998 | Suzuki | 358/298 |

FOREIGN PATENT DOCUMENTS

| | | |
|---|---|---|
| 61-189774 | 8/1986 | (JP) . |
| 2-49592 | 10/1990 | (JP) . |
| 7-57104 | 3/1995 | (JP) . |

* cited by examiner

Primary Examiner—Thomas D. Lee
(74) Attorney, Agent, or Firm—McDermott, Will & Emery

(57) ABSTRACT

Each recording pixel is divided into M small divisions where M is an integer of not less than 2. A threshold pattern is provided for the small divisions where a threshold value is assigned to each of the M small divisions corresponding to each recording pixel. The threshold values assigned to the M small divisions are compared with a multi-tone image signal to produce M pieces of binary comparison results. An image recording signal is generated as a function of a sum n of the M pieces of binary comparison results.

16 Claims, 18 Drawing Sheets

Fig. 1A  CONVENTIONAL THRESHOLD PATTERN

|   | 00 | 01 | 02 | 03 | 04 | 05 | 06 | 07 |
|---|----|----|----|----|----|----|----|----|
| 00 | 14 | 6  | 10 | 13 | 14 | 6  | 10 | 13 |
| 01 | 8  | 0  | 1  | 5  | 8  | 0  | 1  | 5  |
| 02 | 4  | 2  | 3  | 9  | 4  | 2  | 3  | 9  |
| 03 | 12 | 11 | 7  | 15 | 12 | 11 | 7  | 15 |
| 04 | 14 | 6  | 10 | 13 | 14 | 6  | 10 | 13 |
| 05 | 8  | 0  | 1  | 5  | 8  | 0  | 1  | 5  |
| 06 | 4  | 2  | 3  | 9  | 4  | 2  | 3  | 9  |
| 07 | 12 | 11 | 7  | 15 | 12 | 11 | 7  | 15 |

PX

Fig. 1B  THRESHOLD PATTERN OF FIRST EMBODIMENT

|   | 00 | 01 | 02 | 03 | 04 | 05 | 06 | 07 | 08 | 09 | 10 | 11 | 12 | 13 | 14 | 15 |
|---|----|----|----|----|----|----|----|----|----|----|----|----|----|----|----|----|
| 00 | 63 | 46 | 42 | 30 | 41 | 45 | 54 | 61 | 63 | 46 | 42 | 30 | 41 | 45 | 54 | 61 |
| 01 | 58 | 38 | 32 | 18 | 22 | 26 | 37 | 57 | 58 | 38 | 32 | 18 | 22 | 26 | 37 | 57 |
| 02 | 50 | 24 | 14 | 6  | 10 | 13 | 34 | 53 | 50 | 24 | 14 | 6  | 10 | 13 | 34 | 53 |
| 03 | 48 | 20 | 8  | 0  | 1  | 5  | 17 | 29 | 48 | 20 | 8  | 0  | 1  | 5  | 17 | 29 |
| 04 | 28 | 16 | 4  | 2  | 3  | 9  | 21 | 49 | 28 | 16 | 4  | 2  | 3  | 9  | 21 | 49 |
| 05 | 52 | 35 | 12 | 11 | 7  | 15 | 25 | 51 | 52 | 35 | 12 | 11 | 7  | 15 | 25 | 51 |
| 06 | 56 | 36 | 27 | 23 | 19 | 33 | 39 | 59 | 56 | 36 | 27 | 23 | 19 | 33 | 39 | 59 |
| 07 | 60 | 55 | 44 | 40 | 31 | 43 | 47 | 62 | 60 | 55 | 44 | 40 | 31 | 43 | 47 | 62 |
| 08 | 63 | 46 | 42 | 30 | 41 | 45 | 54 | 61 | 63 | 46 | 42 | 30 | 41 | 45 | 54 | 61 |
| 09 | 58 | 38 | 32 | 18 | 22 | 26 | 37 | 57 | 58 | 38 | 32 | 18 | 22 | 26 | 37 | 57 |
| 10 | 50 | 24 | 14 | 6  | 10 | 13 | 34 | 53 | 50 | 24 | 14 | 6  | 10 | 13 | 34 | 53 |
| 11 | 48 | 20 | 8  | 0  | 1  | 5  | 17 | 29 | 48 | 20 | 8  | 0  | 1  | 5  | 17 | 29 |
| 12 | 28 | 16 | 4  | 2  | 3  | 9  | 21 | 49 | 28 | 16 | 4  | 2  | 3  | 9  | 21 | 49 |
| 13 | 52 | 35 | 12 | 11 | 7  | 15 | 25 | 51 | 52 | 35 | 12 | 11 | 7  | 15 | 25 | 51 |
| 14 | 56 | 36 | 27 | 23 | 19 | 33 | 39 | 59 | 56 | 36 | 27 | 23 | 19 | 33 | 39 | 59 |
| 15 | 60 | 55 | 44 | 40 | 31 | 43 | 47 | 62 | 60 | 55 | 44 | 40 | 31 | 43 | 47 | 62 |

DX

☐ SMALL DIVISION DX IN THRESHOLD PATTERN

☐ RECORDING PIXEL PX IN OUTPUT UNIT

COMPARISON RESULTS OF IMAGE SIGNAL WITH CONVENTIONAL THRESHOLD PATTERN (Dimage=8, TL=50%)

COMPARISON RESULTS OF IMAGE SIGNAL WITH THRESHOLD PATTERN OF FIRST EMBODIMENT (Dimage=32, TL=50%)

Fig. 3A  SUMS n OF BINARY COMPARISON RESULTS
(Dimage=32, TL=50%)
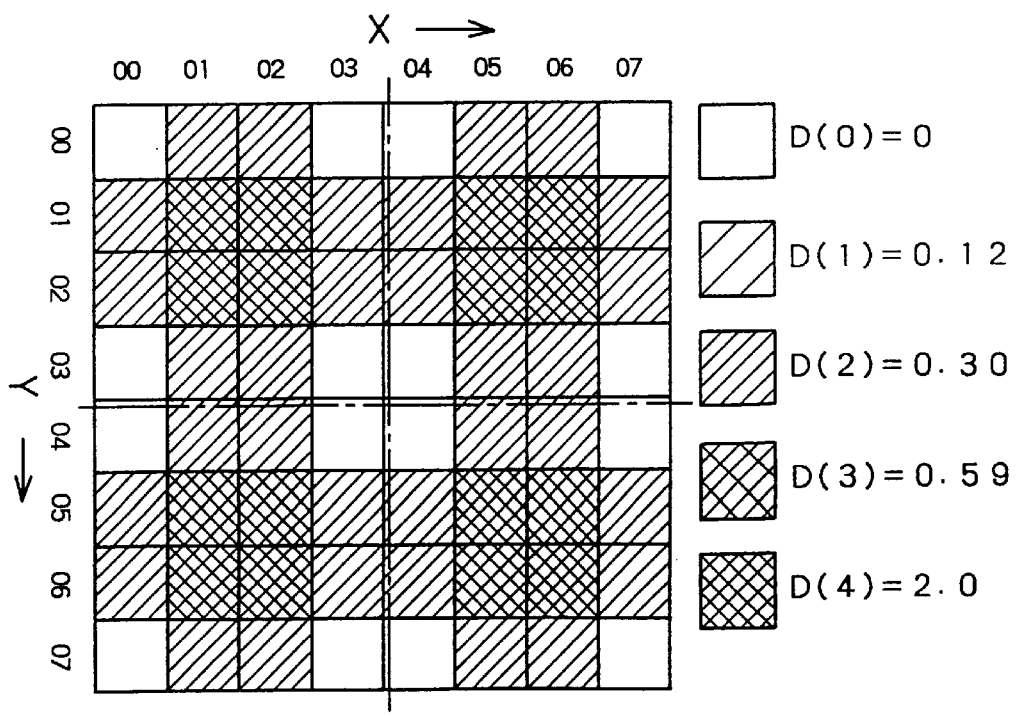
Fig. 3B  PIXEL DENSITIES D(n) CORRESPONDING TO SUMS n
(Dimage=32, TL=50%)

Fig. 4

|  | HATCHING PATTERNS |  | PIXEL DOT SIZES |
|---|---|---|---|
| D(0) = 0 | □ | ↔ | NONE |
| D(1) = 0.12 | ▨ | ↔ | · |
| D(2) = 0.30 | ▨ | ↔ | ○ |
| D(3) = 0.59 | ▩ | ↔ | ○ |
| D(4) = 2.0 | ▩ | ↔ | ● |

COMPARISON RESULTS OF IMAGE SIGNAL WITH THRESHOLD
PATTERN OF FIRST EMBODIMENT (Dimage=30, TL=47%)

Fig. 6A    SUMS n OF BINARY COMPARISON RESULTS
(Dimage=30, TL=47%)

Fig. 6B    PIXEL DENSITIES D(n) CORRESPONDING TO SUMS n
(Dimage=30, TL=47%)

PULSE NUMBER-PIXEL DENSITY CHARACTERISTIC CURVE
(FIRST EMBODIMENT)

CONVENTIONAL THRESHOLD PATTERN WHERE ONE REPETITION BLOCK INCLUDES 4 HALFTONE DOT AREAS

| 56 | 24 | 40 | 52 | 58 | 26 | 42 | 54 |
|----|----|----|----|----|----|----|----|
| 32 | 0  | 4  | 20 | 34 | 2  | 6  | 22 |
| 16 | 8  | 12 | 36 | 18 | 10 | 14 | 38 |
| 48 | 44 | 28 | 60 | 50 | 46 | 30 | 62 |
| 59 | 27 | 43 | 55 | 57 | 25 | 41 | 53 |
| 35 | 3  | 7  | 23 | 33 | 1  | 5  | 21 |
| 19 | 11 | 15 | 39 | 17 | 9  | 13 | 37 |
| 51 | 47 | 31 | 63 | 49 | 45 | 29 | 61 |

Fig. 10B    HALFTONE DOTS RECORDED
(Dimage=17, TL=27%)

THRESHOLD PATTERN OF EMBODIMENT WHERE ONE REPETITION BLOCK INCLUDES 4 HALFTONE DOT AREAS

| 252 | 184 | 168 | 120 | 164 | 180 | 216 | 244 | 254 | 186 | 170 | 122 | 166 | 182 | 218 | 246 |
|---|---|---|---|---|---|---|---|---|---|---|---|---|---|---|---|
| 232 | 152 | 128 | 72 | 88 | 104 | 148 | 228 | 234 | 154 | 130 | 74 | 90 | 106 | 150 | 230 |
| 200 | 96 | 56 | 24 | 40 | 52 | 136 | 212 | 202 | 98 | 58 | 26 | 42 | 54 | 138 | 214 |
| 192 | 80 | 32 | 0 | 4 | 20 | 68 | 116 | 194 | 82 | 34 | 2 | 6 | 22 | 70 | 118 |
| 112 | 64 | 16 | 8 | 12 | 36 | 84 | 196 | 114 | 66 | 18 | 10 | 14 | 38 | 86 | 198 |
| 208 | 140 | 48 | 44 | 28 | 60 | 100 | 204 | 210 | 142 | 50 | 46 | 30 | 62 | 102 | 206 |
| 224 | 144 | 108 | 92 | 76 | 132 | 156 | 236 | 226 | 146 | 110 | 94 | 78 | 134 | 158 | 238 |
| 240 | 220 | 176 | 160 | 124 | 172 | 188 | 248 | 242 | 222 | 178 | 162 | 126 | 174 | 190 | 250 |
| 255 | 187 | 171 | 123 | 167 | 183 | 219 | 247 | 253 | 185 | 169 | 121 | 165 | 181 | 217 | 245 |
| 235 | 155 | 131 | 75 | 91 | 107 | 151 | 231 | 233 | 153 | 129 | 73 | 89 | 105 | 149 | 229 |
| 203 | 99 | 59 | 27 | 43 | 55 | 139 | 215 | 201 | 97 | 57 | 25 | 41 | 53 | 137 | 213 |
| 195 | 83 | 35 | 3 | 7 | 23 | 71 | 119 | 193 | 81 | 33 | 1 | 5 | 21 | 69 | 117 |
| 115 | 67 | 19 | 11 | 15 | 39 | 87 | 199 | 113 | 65 | 17 | 9 | 13 | 37 | 85 | 197 |
| 211 | 143 | 51 | 47 | 31 | 63 | 103 | 207 | 209 | 141 | 49 | 45 | 29 | 61 | 101 | 205 |
| 227 | 147 | 111 | 95 | 79 | 135 | 159 | 239 | 225 | 145 | 109 | 93 | 77 | 133 | 157 | 237 |
| 243 | 223 | 179 | 163 | 127 | 175 | 191 | 251 | 241 | 221 | 177 | 161 | 125 | 173 | 189 | 249 |

Fig. 11B  HALFTONE DOTS RECORDED
(Dimage=68, TL=27%)

PULSE NUMBER-PIXEL DENSITY CHARACTERISTICS
(SECOND EMBODIMENT)

Fig. 16A

THRESHOLD PATTERN WHERE NUMBER OF DIVISIONS M = 6

| 95 | 87 | 73 | 44 | 50 | 68 | 84 | 92 |
|----|----|----|----|----|----|----|----|
| 89 | 81 | 60 | 36 | 42 | 62 | 82 | 90 |
| 79 | 74 | 38 | 20 | 22 | 40 | 70 | 76 |
| 67 | 55 | 27 | 13 | 11 | 24 | 57 | 64 |
| 52 | 32 | 16 | 4  | 9  | 18 | 34 | 59 |
| 48 | 30 | 14 | 0  | 1  | 7  | 29 | 46 |
| 47 | 28 | 6  | 3  | 2  | 15 | 31 | 49 |
| 58 | 35 | 19 | 8  | 5  | 17 | 33 | 53 |
| 65 | 56 | 25 | 10 | 12 | 26 | 54 | 66 |
| 77 | 71 | 41 | 23 | 21 | 39 | 75 | 78 |
| 91 | 83 | 63 | 43 | 37 | 61 | 80 | 88 |
| 93 | 85 | 69 | 51 | 45 | 72 | 86 | 94 |

PX (rows 1–3), DX (row 4)

Fig. 16B

RESULTS OF COMPARISON WITH IMAGE SIGNAL (Dimage=40, TL=42%)

HALFTONE DOTS RECORDED
(Dimage=40, TL=42%)

☐ DENSITY WHEN S(0) = 0.0
▨ DENSITY WHEN S(1) = 0.17
▨ DENSITY WHEN S(2) = 0.33
▩ DENSITY WHEN S(3) = 0.82
▩ DENSITY WHEN S(4) = 1.0

METHOD AND APPARATUS FOR RECORDING HALFTONE IMAGE UTILIZING TONE REPRODUCTION AT EACH PIXEL

BACKGROUND OF THE INVENTION

1. Field of the Invention

The present invention relates to a technique of recording a halftone image utilizing tone reproduction at each pixel.

2. Description of the Related Art

In the conventional technique of recording a halftone image, each recording pixel is recorded in a binary on/off state, and the density of an image is reproduced by a halftone dot percent (a ratio of the ON pixels). The number of tone levels reproducible by one halftone dot increases with the number of recording pixels included in the halftone dot.

In order to increase the number of tone levels reproducible by one halftone dot in the conventional technique, it is required to enhance the resolution of recording pixels, that is, to reduce the size of the recording pixels to increase the number of pixels within one halftone dot. In some recording apparatuses, however, it is difficult to enhance the resolution of recording pixels. A technique that increases the number of tone levels reproducible by one halftone dot without enhancing the resolution of recording dot has been desired.

SUMMARY OF THE INVENTION

Accordingly, an object of the present invention is to increase the number of tone levels reproducible by one halftone dot without enhancing the resolution of recording pixels.

The above and other objects of the present invention are attained at least partly by a method of recording a halftone image utilizing tone reproduction of each pixel. The method comprises the steps of: (a) providing a threshold pattern having threshold values that are assigned respectively to divisions of a unit block including a plurality of pixels, the divisions being obtained by dividing each pixel into M pieces, where M is an integer of at least 2; (b) comparing a given multi-tone image signal with the threshold values in the threshold pattern to thereby generate an image recording signal, the image recording signal representing tone levels of at least 3 for each pixel, the multi-tone image signal having a common value for the M divisions of the same pixel; and (c) recording each pixel in response to the image recording signal, thereby producing a halftone image. The step (b) comprises the step of: (i) comparing the threshold values assigned to the M divisions of each pixel with the multi-tone image signal to obtain M pieces of binary comparison results, and generating the image recording signal as a function of a sum of the M pieces of binary comparison results.

Since each pixel can be recorded by at least three tone levels, the method of the present invention effectively increases the number of tone levels reproducible by one halftone dot, compared with the conventional technique that records each recording pixel in a binary on/off state,.

In a preferred embodiment, each pixel is reproducible at (N+1) density levels in an image output device, where N is an integer in the range of 2 to M, wherein each value of the sum ranging from 0 to M is related to one of the (N+1) density levels, and wherein the step (i) comprises the step of converting the sum into the image recording signal representing one of the reproducible density levels for each pixel. The (N+1) reproducible density levels can be related to (N+1) pixel tone levels which are defined to be area rates obtained by converting the (N+1) reproducible density levels into equivalent area rates of recorded portion of one pixel, and wherein the integer M is selected such that values of the (N+1) pixel tone levels are substantially equal to values of m(j)/M, respectively, where j is an integer ranging from 0 to N and where m(j) are (N+1) pieces of different integers in the range of 0 to M.

Even when the reproducible density levels of the pixels are restricted to the (N+1) levels, this arrangement takes advantage of the restricted density levels and increases the tone levels of the halftone dots.

The step (c) may comprise the step of reproducing a density level of each pixel by overlaying ink droplets where volume of the ink droplets is controlled by the image recording signal. Alternatively, the step (c) may comprise the step of reproducing a density level of each pixel by exposing a recording medium with light where quantity of the light is controlled by the image recording signal.

The present invention is also directed to an apparatus for recording a halftone image utilizing tone reproduction of each pixel. The apparatus comprises: a threshold pattern memory which stores a threshold pattern having threshold values that are assigned respectively to divisions of a unit block including a plurality of pixels, the divisions being obtained by dividing each pixel into M pieces, where M is an integer of at least 2; an image recording signal generator which compares a given multi-tone image signal with the threshold values in the threshold pattern to thereby generate an image recording signal, the image recording signal representing tone levels of at least 3 for each pixel, the multi-tone image signal having a common value for the M divisions of the same pixel; and a recording unit which records each pixel in response to the image recording signal, thereby producing a halftone image. The image recording signal generator comprises a first unit which compares the threshold values assigned to the M divisions of each pixel with the multi-tone image signal to obtain M pieces of binary comparison results, and generates the image recording signal as a function of a sum of the M pieces of binary comparison results.

The present invention is further directed to a method of generating an image recording signal to record a halftone image with an image recording device that is capable of reproducing at least three density levels at each pixel. The method comprises the steps of: (a) providing a threshold pattern having threshold values that are assigned respectively to divisions of a unit block including a plurality of pixels, the divisions being obtained by dividing each pixel into M pieces, where M is an integer of at least 2; and (b) comparing a given multi-tone image signal with the threshold values in the threshold pattern to thereby generate an image recording signal, the image recording signal representing tone levels of at least 3 for each pixel, the multi-tone image signal having a common value for the M divisions of the same pixel.

The present invention is still further directed to an apparatus for generating an image recording signal to record a halftone image with an image recording device that is capable of reproducing at least three density levels at each pixel. The apparatus comprises: a threshold pattern memory which stores a threshold pattern having threshold values that are assigned respectively to divisions of a unit block including a plurality of pixels, the divisions being obtained by dividing each pixel into M pieces, where M is an integer of at least 2; and an image recording signal generator which compares a given multi-tone image signal with the threshold values in the threshold pattern to thereby generate an image recording signal, the image recording signal representing tone levels of at least 3 for each pixel, the multi-tone image signal having a common value for the M divisions of the same pixel.

These and other objects, features, aspects, and advantages of the present invention will become more apparent from the following detailed description of the preferred embodiments with the accompanying drawings.

BRIEF DESCRIPTION OF THE DRAWINGS

FIGS. 1A and 1B show a conventional threshold pattern and a threshold pattern used in a first embodiment of the present invention;

FIGS. 3A and 3B exemplarily show a sum n of binary data Don/off in each recording pixel and pixel density D(n) corresponding to the sum n;

FIG. 4 shows actually recorded dots corresponding to the hatching patterns in FIG. 3B;

FIGS. 10A and 10B show a conventional threshold pattern, where one repetition block has an area including four halftone dots, and halftone dots recorded with this conventional threshold pattern;

FIGS. 11A and 11B show a threshold pattern of the embodiment, where one repetition block has an area including four halftone dots, and halftone dots recorded with this threshold pattern;

FIGS. 16A and 16B show a threshold pattern for one halftone dot when the number of divisions M is equal to 6, and the results of comparison between an image signal and this threshold pattern;

DESCRIPTION OF THE PREFERRED EMBODIMENT

Figure 2A:
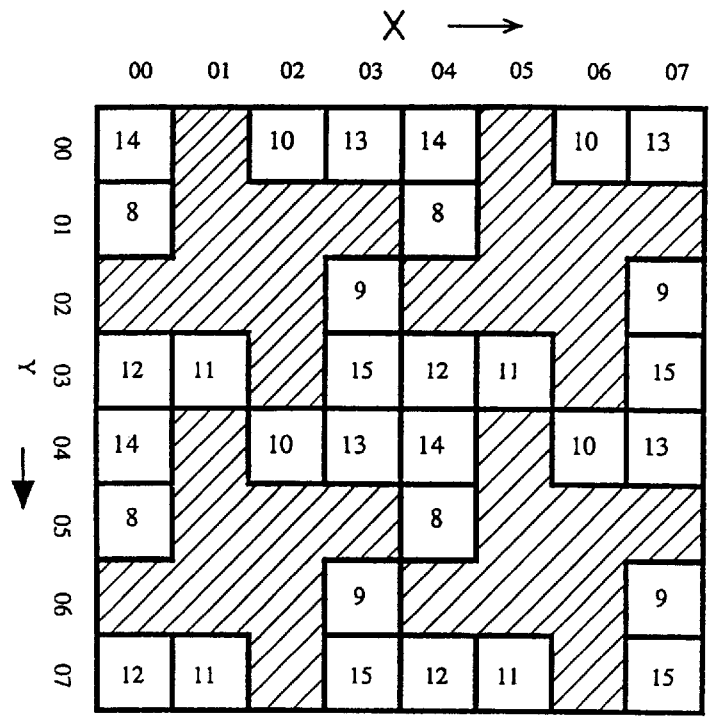
FIGS. 2A and 2B show the results of comparison between an image signal and the conventional threshold pattern, and that between an image signal and the threshold pattern of the first embodiment.

A. Preparation of Threshold Pattern in First Embodiment

FIG. 1A shows a conventional threshold pattern, and FIG. 1B shows a threshold pattern used in a first embodiment according to the present invention. Each small square in FIG. 1A corresponds to a recording pixel PX, which is a unit of recording in an image recording apparatus (image output device). In the conventional threshold pattern, one threshold value is assigned to each recording pixel PX. Four sets of threshold pattern for four halftone dot areas are shown in FIG. 1A where the four halftone dot areas separated by one-dot chain lines. One halftone dot is formed in each halftone dot area. In the example of FIG. 1A, each halftone dot area consists of 16 recording pixels and has threshold values in the range of 0 to 15. The position of each recording pixel PX in the threshold pattern is defined by a main scan address Y and a sub-scan address X.

Each square in FIG. 1B corresponds to a small division DX, which is obtained by dividing the recording pixel PX in the image recording apparatus (image output unit) into four. In the threshold pattern of the first embodiment, one threshold value is assigned to each small division DX. In the example of FIG. 1B, each recording pixel PX is divided into four small divisions DX, so that four different threshold values are assigned to one recording pixel PX. It may also be considered that the small division DX of the threshold pattern shown in FIG. 1B has the resolution twice as much as the recording pixel PX of the image recording apparatus. One halftone dot area consists of 64 small divisions and has threshold values in the range of 0 to 63. The position of each small division DX in the threshold pattern is defined by a main scan address j and a sub-scan address i.

As clearly seen from the arrangement of the threshold values in FIG. 1B, sixty-four threshold values are arranged such that they increase gradually from the center of the halftone dot area toward the periphery. There is no specific relationship between the arrangement of the threshold values and the boundaries of the recording pixels. It is preferable that the threshold values are arranged to increase gradually from the center of the halftone dot area toward the periphery, irrespective of the boundaries of the recording pixels. The advantage of this threshold pattern will be described later.

A multi-tone image signal is applied to each recording pixel. In the threshold pattern of the first embodiment, the multi-tone image signal applied to one recording pixel is compared with the four threshold values assigned to the four small divisions. The results of the comparison between each threshold value Th and a multi-tone image signal Dimage (hereinafter referred to as the 'binary comparison results') are expressed by binary data Don/off given below:

when Dimage>Th:Don/off=1 (ON); and when Dimage≦Th:Don/off=0 (OFF).

The binary comparison results Don/off are summed for each recording pixel. A sum n of the binary data Don/off for each recording pixel is an integer in the range of 0 to 4 accordingly.

Figure 2B:
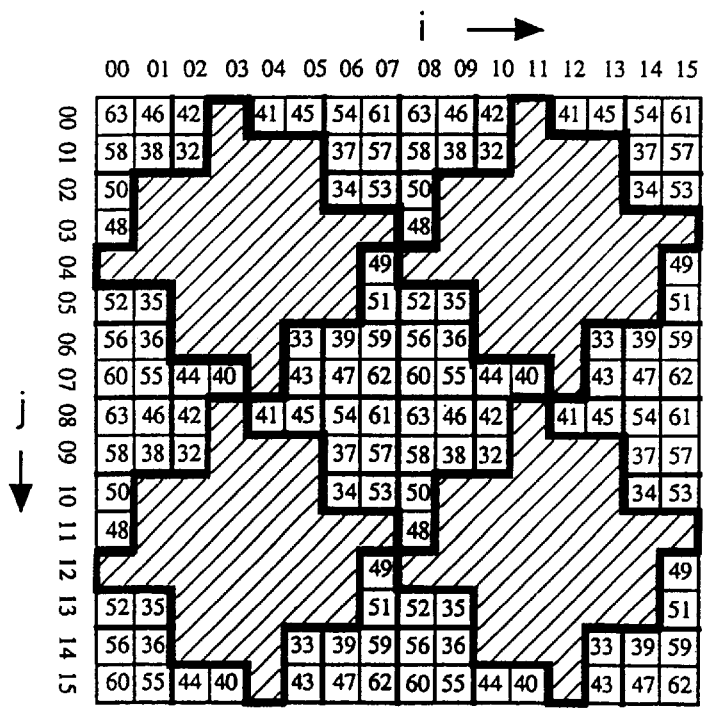

FIG. 2A shows the results of comparison between the image signal and the threshold values in the conventional threshold pattern shown in FIG. 1A as one example. FIG. 2B shows the results of comparison between the image signal and the threshold values in the threshold pattern of the first embodiment shown in FIG. 1B as one example. In FIGS. 2A and 2B, a halftone level TL is equal to 50%. The 'halftone level' TL denotes a tone level of one halftone dot and is obtained by dividing the image signal Dimage by ([maximum of the threshold values Th]+1). In the example of FIG. 2A, the threshold values Th are in the range of 0 to 15, so that the value of the image signal Dimage corresponding to the halftone level TL of 50% is equal to 8. In the example of FIG. 2B, the threshold value Th are in the range of 0 to 63, so that the value of the image signal Dimage corresponding to the halftone level TL of 50% is equal to 32. In FIGS. 2A and 2B, the binary comparison result Don/off is equal to one (ON) in the portions filled with slant lines and is equal to zero (OFF) in the portions where the threshold values are written.

The conventional technique records halftone dots by filling the recording pixels in the slant-line portions shown in FIG. 2A with solid black. In the first embodiment, on the other hand, the binary comparison results Don/off shown in FIG. 2B are summed for each recording pixel, and each pixel is recorded according to the sum n.

FIG. 3A shows the sum n of the binary comparison results Don/off for each recording pixel in the embodiment. In each halftone dot area, the sum n gradually decreases from the center toward the periphery. This tendency is ascribed to the arrangement of the threshold values, which increase gradually from the center of the halftone dot area toward the periphery, in the threshold pattern of FIG. 1B.

In the first embodiment, the density of each recording pixel is determined according to the sum n of the binary comparison results obtained for the recording pixel. The density of the recording pixel having the sum n is determined to coincide with the density obtained on the assumption that n small divisions in the recording pixel are filled with solid black. Application of Yule-Nielsen's Equation, which represents the relationship between the ratio of the area of black regions on a recording medium and the density, determines a pixel density D(n) corresponding to the sum n of the binary comparison results expressed as Equation 1:

$$D(n) = -\log\left(\frac{1}{10^{Ds}} \times \frac{n}{M} + \frac{1}{10^{D0}} \times \frac{M-n}{M}\right) \quad (1)$$

where M denotes the number of small divisions in each recording pixel and is equal to 4 in the example of FIG. 1B, Ds denotes the density of a black region (recorded area), and $D_0$ denotes the density of a white area (non-recorded area).

The sum n of the binary comparison results Don/off in one recording pixel may take the value in the range of 0 to 4. The pixel densities D(n) corresponding to the values 0 through 4 of the sum n are obtained by substituting the respective values n into Equation 1 and given by Equations 2a–2e:

$$D(0) = -\log\left(\frac{1}{10^{D0}}\right) = D0 \quad (2a)$$

$$D(1) = -\log\left(\frac{1}{10^{Ds}} \times \frac{1}{4} + \frac{1}{10^{D0}} \times \frac{3}{4}\right) \quad (2b)$$

$$D(2) = -\log\left(\frac{1}{10^{Ds}} \times \frac{1}{2} + \frac{1}{10^{D0}} \times \frac{1}{2}\right) \quad (2c)$$

$$D(3) = -\log\left(\frac{1}{10^{Ds}} \times \frac{3}{4} + \frac{1}{10^{D0}} \times \frac{1}{4}\right) \quad (2d)$$

$$D(4) = -\log\left(\frac{1}{10^{Ds}}\right) = Ds \quad (2e)$$

On the assumption that Ds=2.0 and $D_0$=0, for example, the values of D(0) through D(4) are given as follows:
D(0)=0.0;
D(1)=0.12;
D(2)=0.30;
D(3)=0.59; and
D(4)=2.0

The respective recording pixels are recorded to have the pixel densities D(0) through D(4) according to the sum n of the binary comparison results. This regulates the tone levels of each recording pixel to reproduce the image density expressed by the original multi-tone image signal Dimage.

FIG. 3B shows pixel densities D(n) of the recording pixels recorded according to the distribution of the sums n shown in FIG. 3A. In FIG. 3B, four halftone dots are separated by one-dot chain lines. The pixel density D(n) of each recording pixel in each halftone dot tends to decrease gradually from the center of the halftone dot toward the periphery. This tendency is ascribed to the arrangement of the threshold values, which increase gradually from the center of the halftone dot area toward the periphery, in the threshold pattern shown in FIG. 1B. Application of such a threshold pattern causes the density of a plurality of recording pixels constituting one halftone dot to change gradually from the center of the halftone dot toward the periphery, thereby ascertaining a smooth tone expression as a whole halftone dot.

FIG. 4 shows pixel dots (recording pixels) actually recorded corresponding to the hatching patterns of FIG. 3B. The pixel dot recorded on the recording medium has the greater size and the deeper color for the higher pixel density D(n). By way of example, in the image recording apparatus (image output device) that adopts the inkjet printing method, such pixel dots are created by increasing the number of ink droplets spouted to record one pixel dot according to the pixel density. The number of ink droplets spouted on one pixel dot is regulated by adjusting the number of pulses and the quantity of energy given to the drive unit of ink nozzles. The technique of overlaying ink droplets to record one pixel dot causes the pixel dot size and the pixel dot density to increase wit the number of ink droplets. As clearly understood from this example, the expression of 'changing the pixel density' is not restricted to the case where the recorded dots (recording pixels) have an identical size and different densities but includes a variety of cases where at least either one of the dot size and the dot density is varied.

Figure 5:
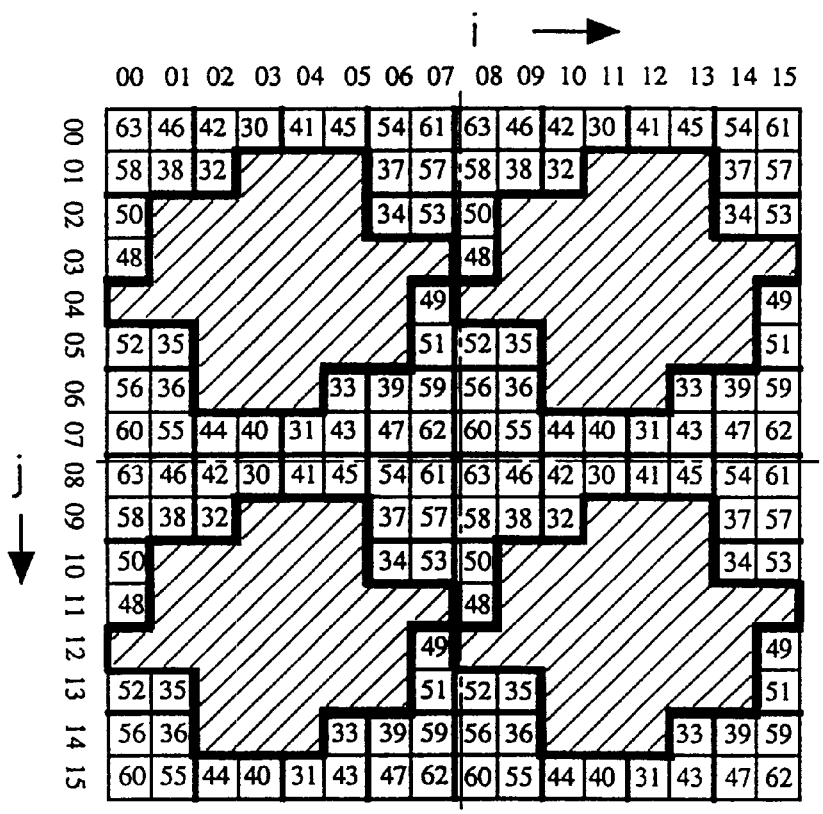
FIG. 5 shows the results of comparison between the image signal and the threshold values as another example.
Figure 6:
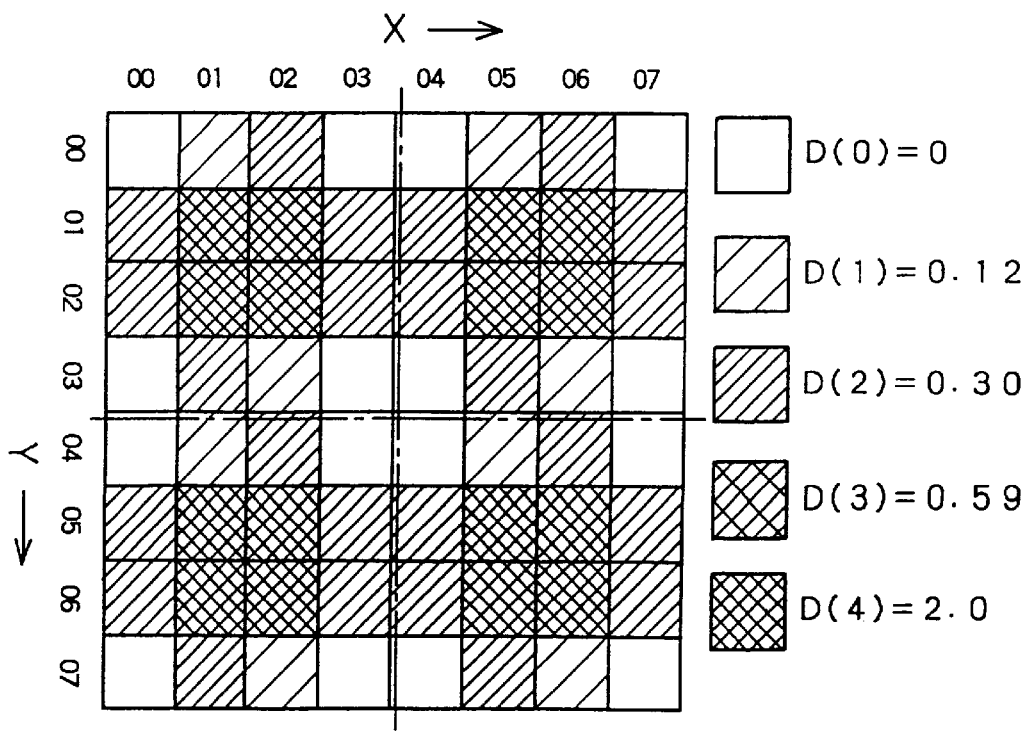
FIGS. 6A and 6B show a sum n of binary data Don/off in each recording pixel and pixel density D(n) corresponding to the sum n as another example.

FIG. 5 shows the results of comparison between the image signal and the threshold values, where the value of the image signal Dimage is equal to 30. In this example, the halftone level TL is 47%. FIG. 6A shows the sum n of the binary comparison results Don/off for each recording pixel in FIG. 5. FIG. 6B shows the pixel densities D(n) of the respective recording pixels recorded according to the distribution of the sums n. As shown in FIG. 6A, the recording pixels having the sum n of the binary comparison results equal to 1 appear in the periphery of each halftone dot.

Figure 7:
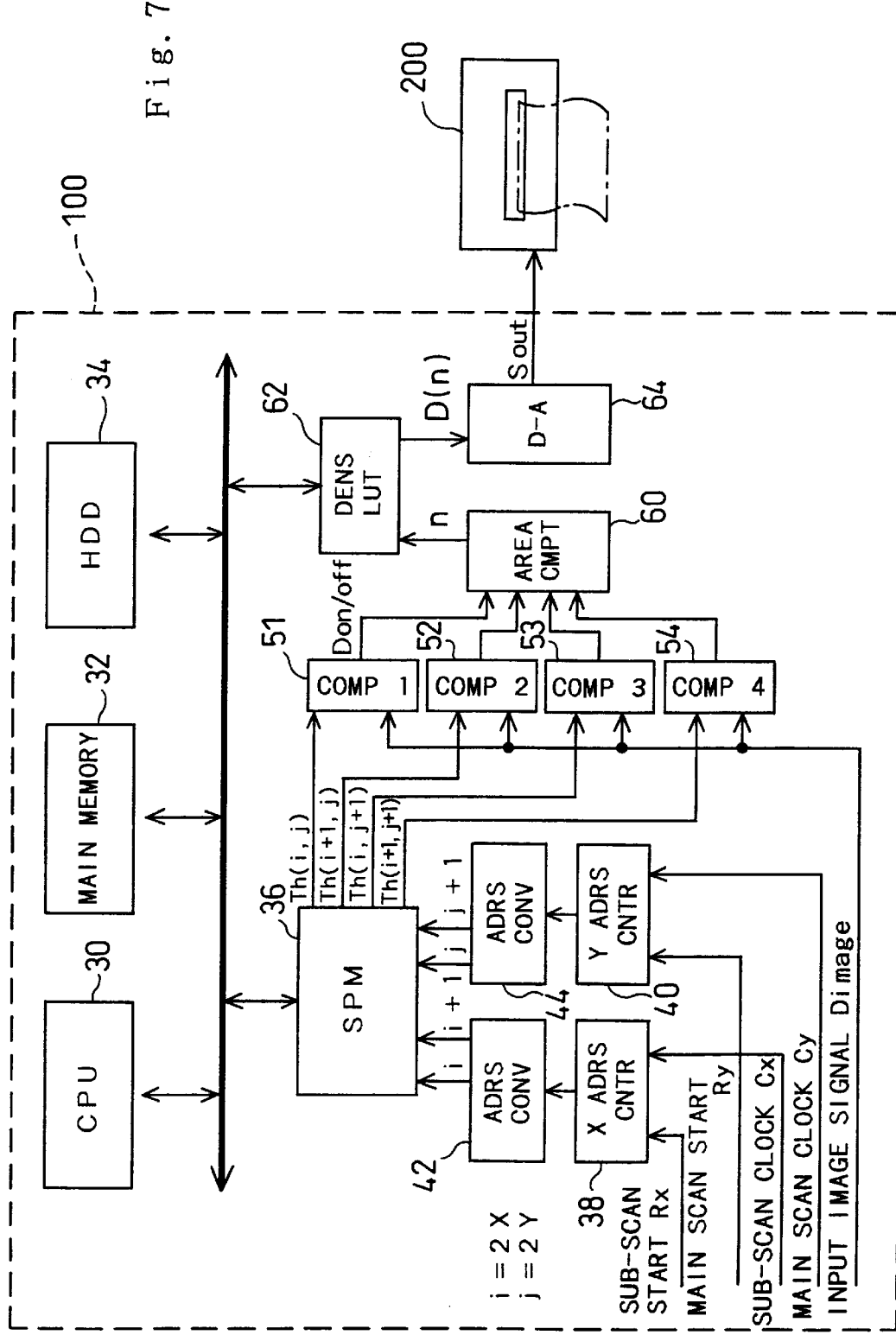
FIG. 7 is a block diagram illustrating the structure of a halftone image recording system embodying the present invention.

FIG. 7 is a block diagram illustrating the structure of a halftone image recording system embodying the present invention. The halftone image recording system includes an image recording signal generator 100 and an image output unit 200. The image output unit 200 is of an inkjet type that regulates the number of ink droplets to form one pixel dot (recording pixel) to thereby reproduce the tone levels of the respective recording pixels. The image recording signal generator 100 includes a CPU 30, main memories (ROM and RAW 32, a hard disk drive 34, a screen pattern memory (SPM) 36, a sub-scan address counter 38, and a main scan address counter 40, two address converters 42 and 44, four comparators 51 through 54, an area computation unit 60, a density look-up table 62, and an D-A converter 64.

The SPM 36 stores a threshold pattern within a predetermined repetition block. The 'repetition block' denotes one threshold pattern that is repeatedly applied on the image plane or the area thereof. The repetition block includes threshold values required to substantially reproduce at least one halftone dot. In the first embodiment, for example, the threshold values corresponding to one halftone dot in FIG. 1B are stored as the repetition block in the SPM 36. The repetition block may include threshold values of the area that is less than one halftone dot, as long as the repetition block can substantially reproduce one halftone dot.

The SPM 36 corresponds to the threshold pattern memory of the present invention. The circuit elements 36 through 64 shown in the lower portion of FIG. 7 as a whole correspond to the image recording signal generator (image recording signal circuit) of the present invention.

A sub-scan start signal Rx and a sub-scan clock signal Cx are input in the sub-scan address counter 38. The sub-scan start signal Rx generates one pulse every time when the sub-scan coordinate of the recording pixel in the image output unit 200 is reset to the initial position. The sub-scan clock signal Cx generates one pulse every time when the sub-scan coordinate of the recording pixel is updated. The sub-scan address counter 38 generates a sub-scan address X of the recording pixel in the repetition block responsive to these signals Rx and Cx. In a similar manner, the main scan address counter 40 generates a main scan address Y of the recording pixel in the repetition block responsive to a main scan start signal Ry and a main scan clock signal Cy. The first address converter 42 converts the sub-scan address X of the recording pixel into sub-scan addresses i and (i+1) for the small divisions of the threshold pattern. The value of the first sub-scan address i of the small division is equal to twice the sub-scan address X of the recording pixel. As clearly understood from FIGS. 1A and 1B, the sub-scan addresses i and (i+1) of the small divisions represent sub-scan coordinates of the four small divisions included in the sub-scan address X of the recording pixel. The second address converter 44 converts the main scan address Y of the recording pixel into main scan address j and (j+1) for the small divisions of the threshold pattern. The value of the first main scan address j of the small division is equal to twice the main scan address Y of the recording pixel.

The sub-scan addresses i and (i+1) and the main scan addresses j and (j+1) of the small divisions thus obtained are supplied to the SPM 36. These addresses i, (i+1), j, and (j+1) specify coordinates (i,j), (i+1,j), (i,j+1), and (i+1,j+1) of the four small divisions corresponding to one recording pixel. Threshold values Th(i,j), Th(i+1,j), Th(i,j+1), and Th(i+1, j+1) of the four small divisions corresponding to one recording pixel are read from the SPM 36 and respectively supplied to the four comparators 51 through 54.

Each of the comparators 51 through 54 compares the input threshold value Th with the input image signal Dimage and generates the binary comparison result Don/off. The area computation unit 60 is an adder that adds the four binary comparison results Don/off output from the four comparators 51 through 54 and calculates the sum n. The sum n is converted into the pixel density D(n) in the density look-up table 62. This conversion is carried according to Equation 1 discussed above. The density look-up table 62 is accordingly a memory that receives the sum n as the input address and generates the pixel density D(n) as the output data. The pixel density D(n) is further converted into an analog image recording signal Sout by the D-A converter 64. The image output unit 200 spouts ink droplets on a recording medium (for example, a printing sheet) in response to the image recording signal Sout and thereby creates a halftone image on the recording medium.

Figure 8:
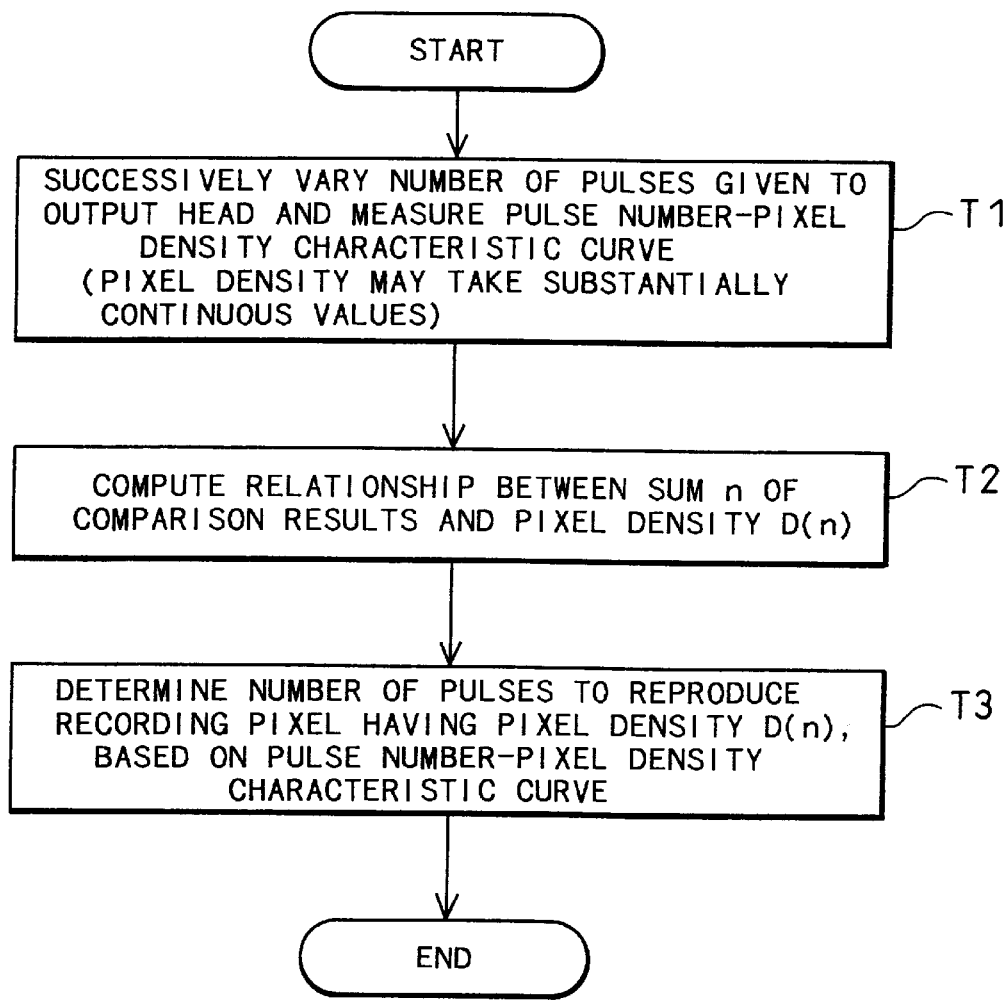
FIG. 8 is a flowchart showing the process of determining relationship between the sum n of the comparison results and the number of pulses given to an output head of an image output unit in the first embodiment.
Figure 9:
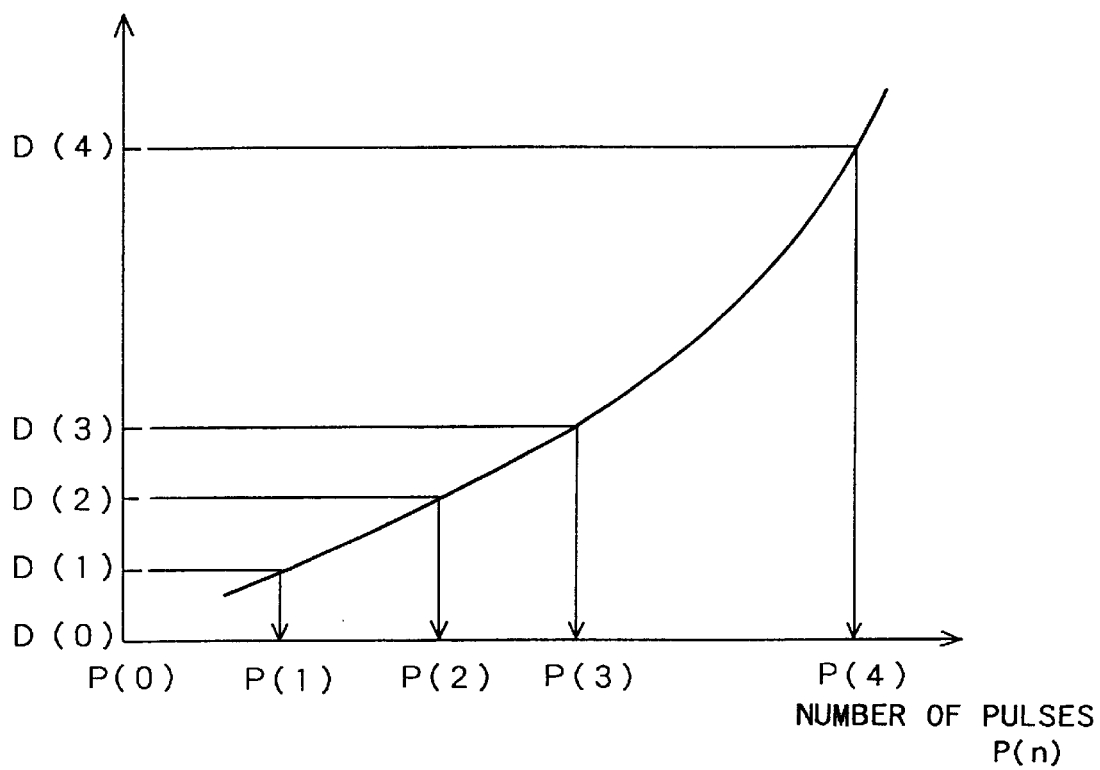
FIG. 9 is a graph showing an example of a pulse number-pixel density characteristic curve.

FIG. 8 is a flowchart showing the process of determining the relationship between the sum n of the comparison results and the number of pulses given to the output head of the image output unit 200 in the first embodiment. The process successively varies the number of pulses given to the output head of the image output unit 200 and creates a large number of pixels dots (recording pixels) having different pixel densities at step T1. The densities of the pixel dots are measured with a densitometer. The process accordingly determines a pulse number-pixel density characteristic curve representing the relationship between the number of pulses given to the output head and the pixel density. FIG. 9 is a graph showing an example of the pulse number-pixel density characteristic curve. In the first embodiment, it is assumed that the image output unit 200 can reproduce substantially continuous pixel densities.

The process computes the relationship between the sum n of the comparison results and the pixel density D(n) according to Equation 1 discussed above at step T2. A number of small divisions M included in one recording pixel (hereinafter also referred to as the 'number of divisions of the recording pixel') are previously set to a desirable integer of not less than 2. The process of step T2 accordingly calculates the pixel densities D(n) when the sum n is equal to each value in the range of 0 to M.

The process determines a number of pulses P(n) to create the recording pixels having the pixel densities D(n) (n=0 to M) calculated at step T2, based on the pulse number-pixel density characteristic curve shown in FIG. 9. This relates the sum n of the comparison results to the number of pulses P(n) given to the output head.

As shown in FIG. 7, the analog signal Sout representing the pixel density D(n) is transmitted from the image recording signal generator 100 to the image output unit 200. The image output unit 200 converts the analog signal Sout into the number of pulses P(n) according to the relationship shown in FIG. 9.

Alternatively, the density look-up table 62 shown in FIG. 7 may directly convert the sum n of the binary comparison results into the number of pulses P(n). In this case, the signal Sout representing the number of pulses P(n) is given to the image output unit 200. The image output unit 200 is thus not required to convert the input signals and thereby increases the speed of recording the halftone image.

The first embodiment discussed above reproduces the tone levels of the whole halftone dot based on both the number of recorded pixels and the pixel densities of the recorded pixels. Compared with the conventional structure that expresses the tone levels of the halftone dot only based on the number of recorded pixels (that is, the halftone dot area rate), this structure enables an increase in number of tone levels reproducible by one halftone dot.

Figure 10A:
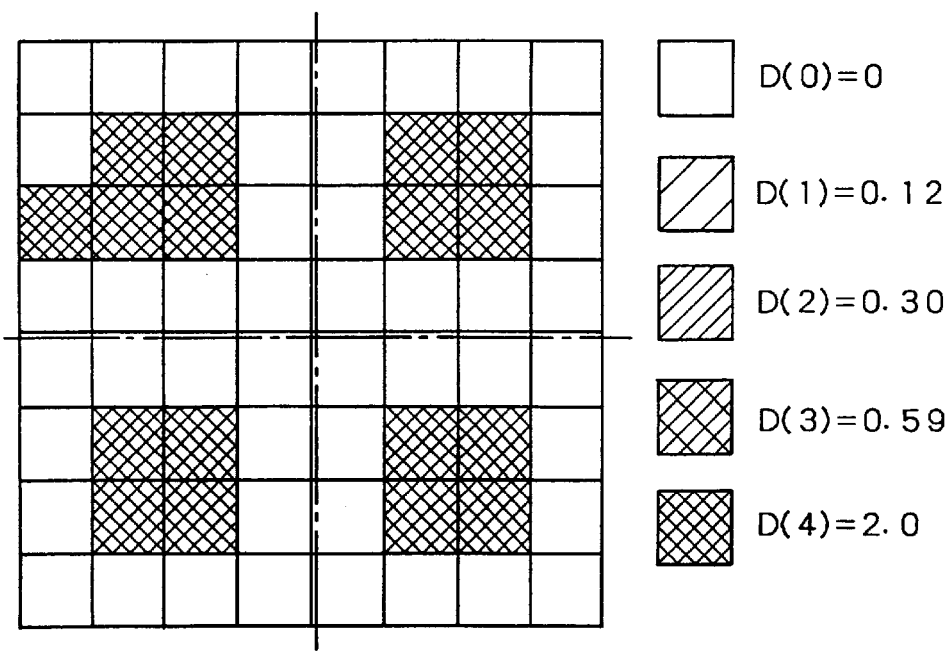

In the first embodiment, the size of the repetition block stored in the SPM 36 may be set to an area that includes a plurality of halftone dots. FIG. 10A shows a conventional threshold pattern where one repetition block has an area including four halftone dots. FIG. 10B shows halftone dots recorded with this conventional threshold pattern. The four halftone dot areas shown in FIG. 10A (boundaries are shown by the one-dot chain lines) have different threshold patterns. This arrangement may cause halftone dots created in the four halftone dot areas to have different shapes in response to an identical image signal. Actually, in the case where the value of the image signal Dimage is fixed to 17 (halftone level TL=27%), one of the four halftone dots consists of five black pixels, whereas the other three halftone dots respectively consist of four black pixels as shown in FIG. 10B. In a wide uniform image area, the halftone dots consisting of the five black pixels appears at a specific cycle among a large number of halftone dots having four black pixels; this causes unevenness of the image, which is to be recognizable with naked eyes.

Figure 11A:
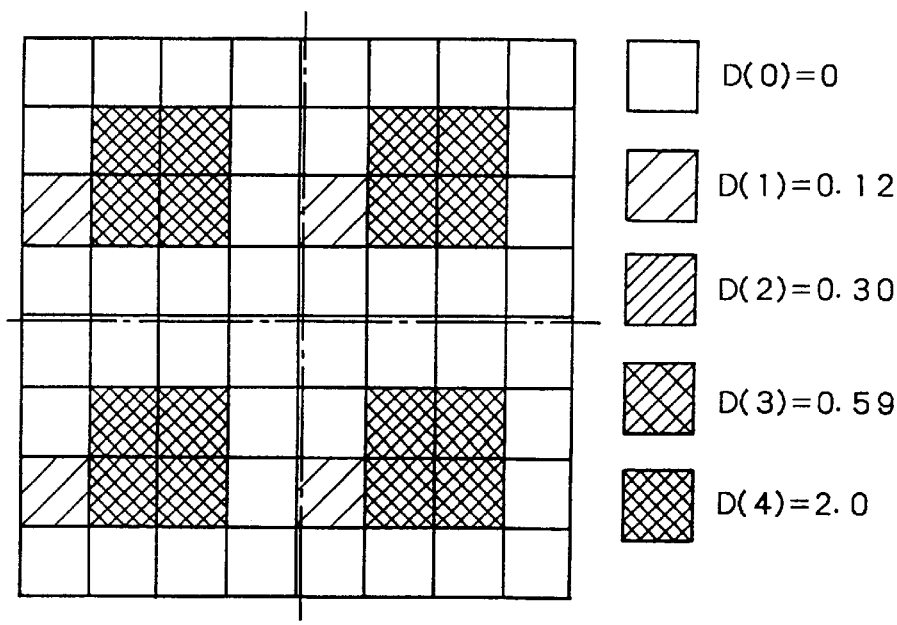

FIG. 11A shows a threshold pattern of this embodiment where one repetition block has an area including four halftone dots. FIG. 11B shows halftone dots recorded with this threshold pattern of the embodiment. The four halftone dot areas shown in FIG. 11A have different threshold patterns. The pixel density of each recording pixel is determined according to the sum n of the binary comparison results in each recording pixel. This arrangement effectively reduces the occurrence of unevenness of the image, compared with the conventional technique shown in FIG. 10. Actually, the four halftone dots shown in FIG. 11B have an identical shape and an identical density, which causes no unevenness of the image. The first embodiment has an advantage of reducing unevenness of the image when the repetition block has an area including a plurality of halftone dots.

B. Second Embodiment

The first embodiment is on the assumption that the image output unit 200 reproduces substantially continuous pixel densities. There are, however, some image output units 200 that can reproduce only discrete pixel densities. A second embodiment of the present invention described below is on the assumption that the number of pixel densities available in the image output unit 200 is restricted to (N+1). As described later, the value of the integer N is set independently of the sum n of the binary comparison results.

Figure 12:
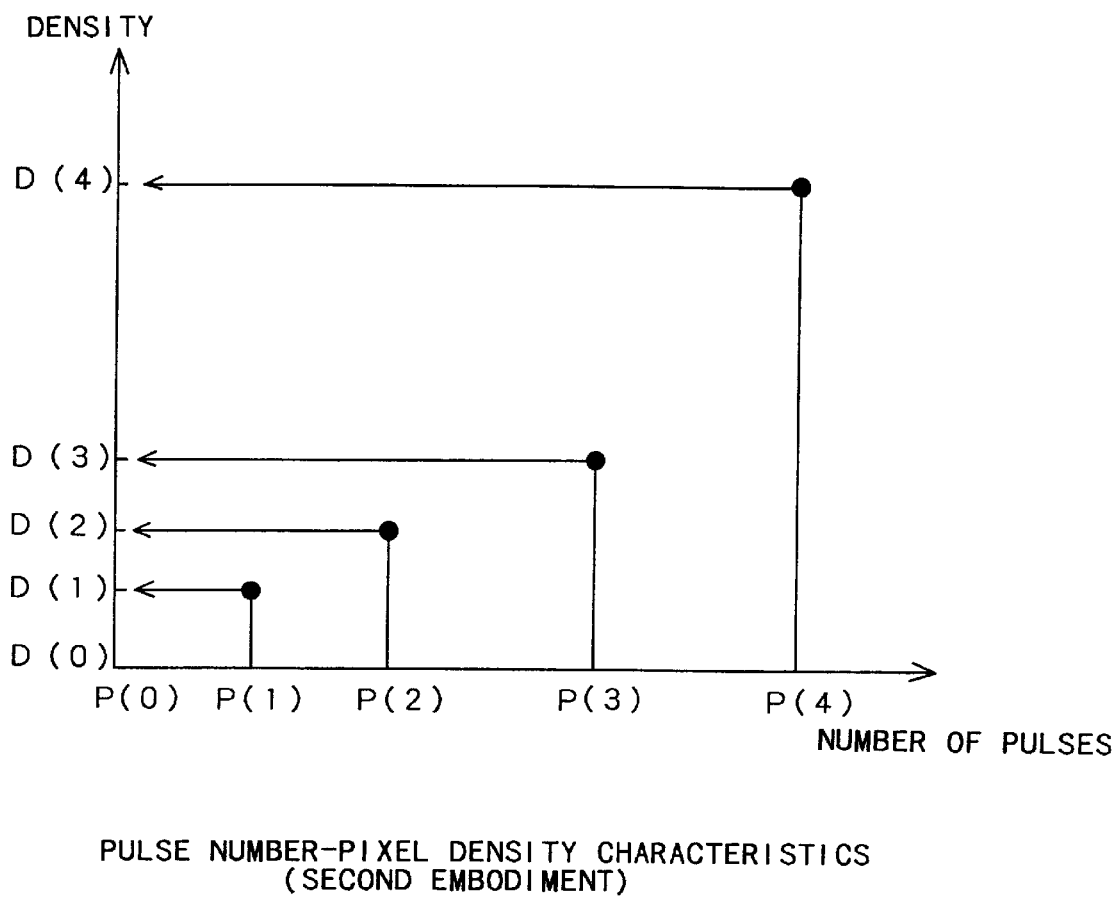
FIG. 12 is a graph showing pulse number-pixel density characteristics where available pixel densities D(N) are discrete.

FIG. 12 is a graph showing pulse number-pixel density characteristics in the case where the available pixel densities D(N) are discrete. In this example, it is assumed that only the five pixel densities D(0) through D(4) are available.

Figure 13:
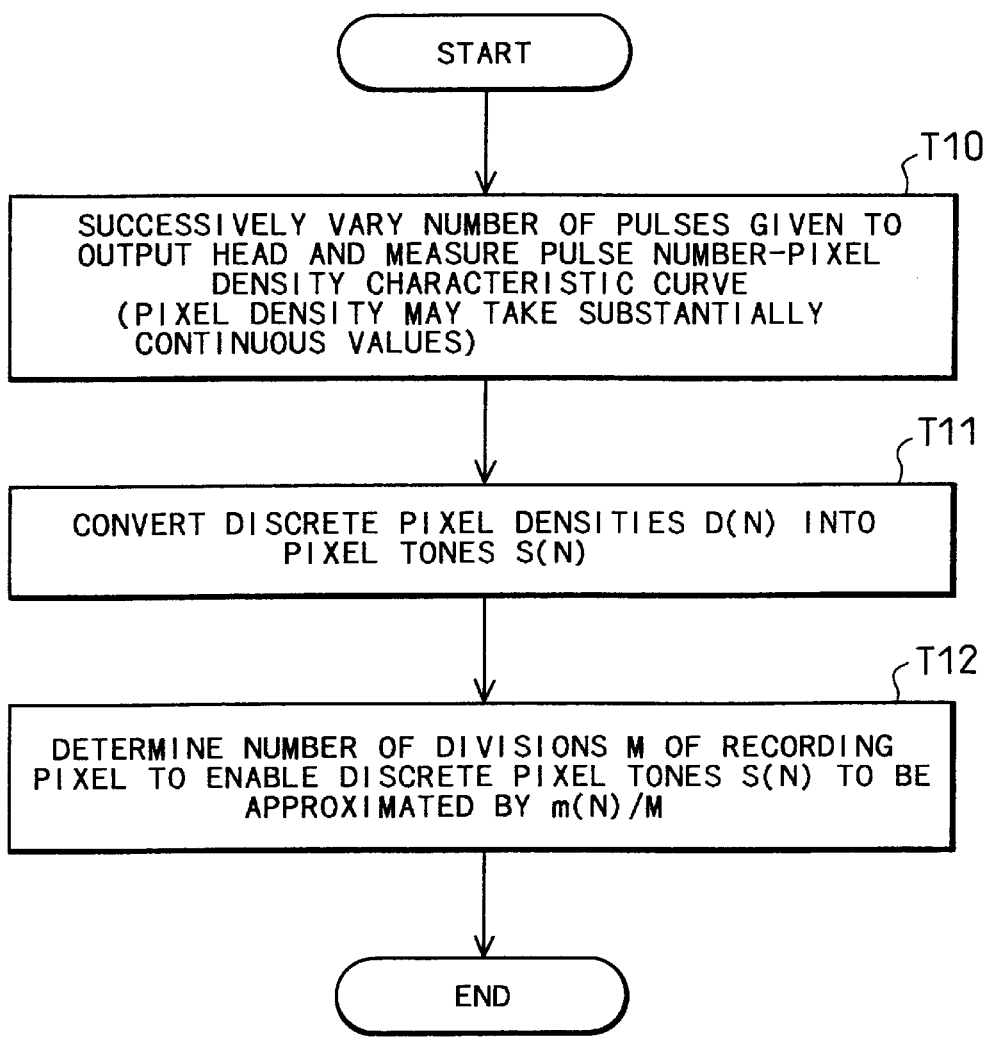
FIG. 13 is a flowchart showing the process of determining relationship between the sum n of the comparison results and the number of pulses given to an output head of an image output unit in a second embodiment.

FIG. 13 is a flowchart showing the process of determining the relationship between the sum n of the comparison results and the number of pulses given to the output head of the image output unit 200 in the second embodiment. The process successively varies the number of pulses P(N) given to the output head of the image output unit 200 and creates (N+1) different types of pixel dots (recording pixels) having different pixel densities D(N) at step T10. The densities of the pixel dots are measured with a densitometer. The process accordingly determines a pulse number-pixel density characteristic curve representing the relationship between the number of pulses given to the output head and the pixel density (see FIG. 12).

The process converts the available pixel density D(N) into a pixel tone S(N) at step T11. The pixel tone S(N) denotes an equivalent area-rate corresponding to the pixel density D(N) of the recording pixel (that is, the ratio of an area of the black regions on the assumption that the recording pixel having the pixel density D(N) is realized by adjusting the area of the black regions in the recording pixel). The conversion of the pixel density D(N) into the pixel tone S(N) is performed according to either one of Equation 3 and Equation 4, which are rewritten from Equation 1:

$$D(N) = -\log\left\{\frac{1}{10^{Ds}} \times S(N) + \frac{1}{10^{D0}} \times (1 - S(N))\right\} \quad (3)$$

$$S(N) = \frac{10^{-D(N)} - 10^{-D0}}{10^{-Ds} - 10^{-D0}} \quad (4)$$

In a concrete procedure, the available values D(0) through D(4) are substituted into the pixel density D(N) of Equation 4 to obtain the pixel tone levels S(0) through S(4) related to these available values. The pixel tone S(N) related to the available pixel density D(N) is hereinafter simply referred to as the 'available pixel tone'. The values of the available pixel tone levels S(0) through S(4) gradually increase with N and satisfy the relationship of Expression 5:

$$0=S(0)<S(1)<S(2)<S(3)<S(4)=1 \quad (5)$$

Referring back to the flowchart of FIG. 13, the process determines a number of divisions M of the recording pixel at step T12. The number of divisions M is determined in such a manner that the discrete values of the available pixel tone S(N) are approximated by approximate pixel tone levels m(N)/M, where m(N) denotes an integer selected out of the range of 0 to M with respect to each value of N.

Figure 14:
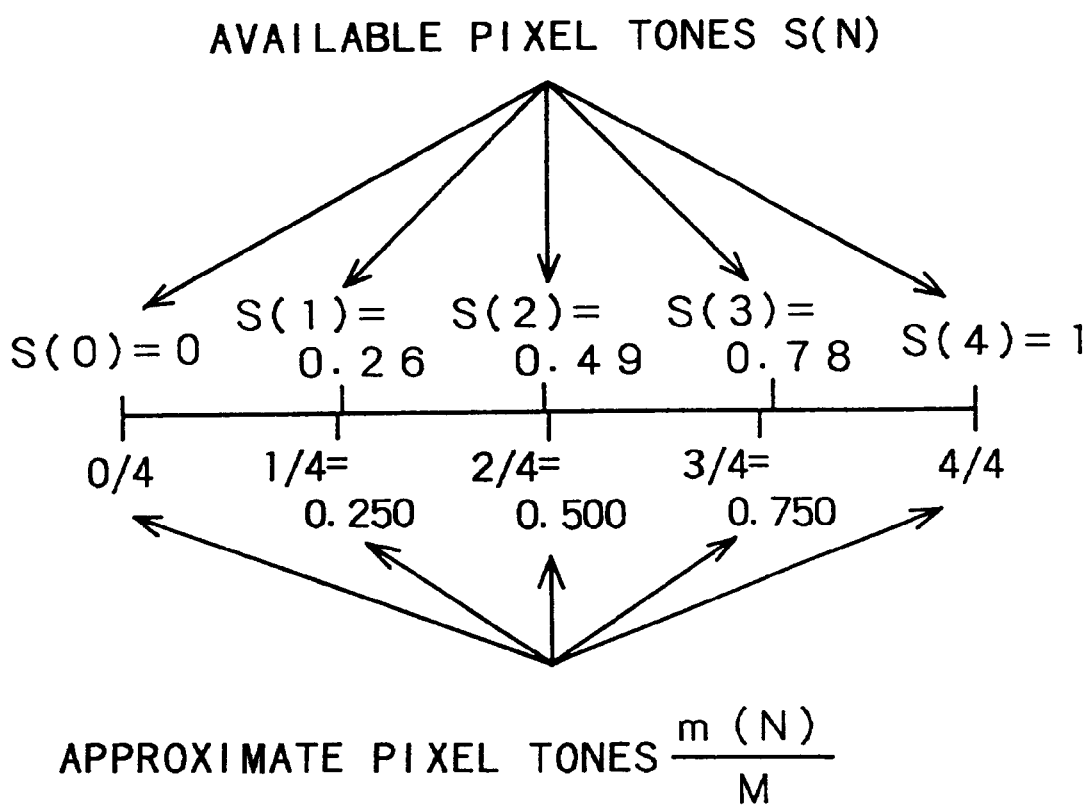
FIG. 14 shows one example of the relationship between available pixel tone levels S(N) and approximate pixel tone levels m(N)/M.

FIG. 14 shows one example of the relationship between the available pixel tone S(N) and the approximate pixel tone m(N)/M. The following gives the values of the available pixels tone S(N), which depend upon the performance of the image output unit 200, and the difference ΔS between the adjoining pixel tone levels in this example:

S(0)=0.00;
S(1)=0.26, ΔS=0.26;
S(2)=0.49, ΔS=0.23;
S(3)=0.78, ΔS=0.29; and
S(4)=1.00, ΔS=0.22 (=ΔSmin).

In the example of FIG. 14, the number of divisions M is set equal to 4. The values of the available pixel tone S(N) are thus substantially equal to the values of the approximate pixel tone m(N)/M as shown below:

S(0)=0.00→m(1)/M=0/4=0.00;
S(1)=0.26→m(2)/M=1/4 =0.25;
S(2)=0.49→m(3)/M=2/4 =0.50;
S(3)=0.78→m(4)/M=3/4 =0.75; and
S(4)=1.00→m(5)/M=4/4 =1.00.

In the example of FIG. 14, the number of divisions M is equal to 4. The relationship between the recording pixels and the small divisions is accordingly equivalent to that discussed in the first embodiment (for example, FIG. 1B).

Figure 15:
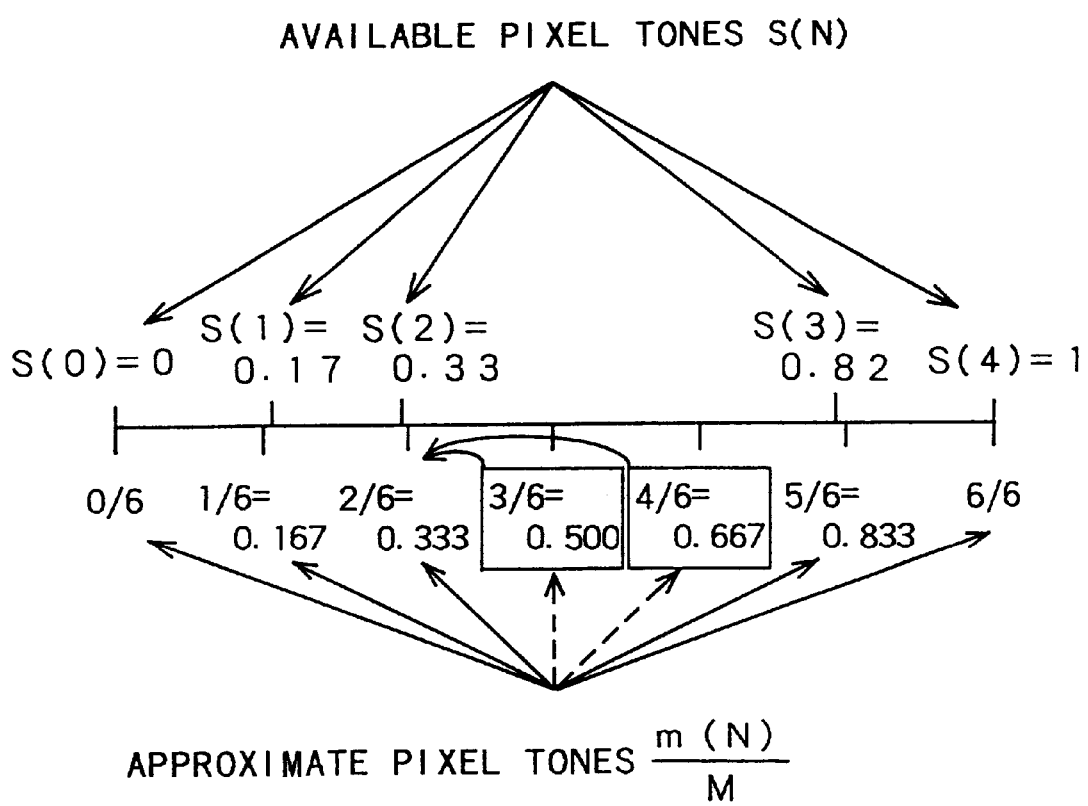
FIG. 15 shows another example of the relationship between the available pixel tone levels S(N) and the approximate pixel tone levels m(N)/M.

FIG. 15 shows another example of the relationship between the available pixel tone S(N) and the approximate pixel tone m(N)/M. The following gives the values of the available pixels tone S(N), which depends upon the performance of the image output unit 200, and the difference ΔS between the adjoining pixel tone levels in this example:

S(0)=0.00;
S(1)=0.17, ΔS=0.17;
S(2)=0.33, ΔS=0.16 (=ΔSmin);
S(3)=0.82, ΔS=0.49; and
S(4)=1.00, ΔS=0.18.

As described above, the number of divisions M is selected in such a manner that the available pixel tone levels S(N) are substantially equal to the approximate pixel tone levels m(N)/M (where m(N) denotes integers selected out of the range of 0 to M). In the example of FIG. 15, the number of divisions M is set equal to 6, which is substantially equal to the reciprocal of the minimum ΔSmin among the differences ΔS between the available pixel tone levels S(N). The values of the available pixel tone S(N) are thus substantially equal to the values of the approximate pixel tone m(N)/M as shown below:

S(0)=0.00→m(1)/M=0/6=0.00;
S(1)=0.17→m(2)/M=1/6=0.17;
S(2)=0.33→m(3)/M=2/6=0.33;
S(3)=0.82→m(4)/M=5/6=0.83; and
S(4)=1.00→m(5)/M=6/6=1.00.

When the number of divisions M is set equal to 6, the sum n of the binary comparison results corresponding to one recording pixel may take seven values in the range of 0 to 6, so that the value n/M obtained by dividing the sum n by the number of divisions M can also take seven values of 0/6 to 6/6. Among these seven values 0/6 to 6/6, the two values 3/6 and 4/6 shown by the broken arrows in FIG. 15 are not directly related to the available pixel tone levels S(N). By considering the case where the sum n of the binary comparison results in the recording pixel is equal to 3 or 4, each of these sums is thus related in advance to one of the available pixel tone levels. By way of example, when the sum n of the binary comparison results is equal to 3 or 4, the recording pixel is reproduced by the third pixel tone S(2). In another example, the recording pixel is reproduced by the third pixel tone S(2) when the sum n of the binary comparison results is equal to 3, whereas the recording pixel is reproduced by the fourth pixel tone S(3) when the sum n of the binary comparison results is equal to 4. Mapping of the sum n of the binary comparison results to the available pixel tone S(N) (or mapping of the sum n of the binary comparison results to the available pixel density D(N)) may be varied by rewriting the contents of the density look-up table 62 shown in FIG. 7.

As clearly understood from the example of FIG. 15, it is not necessary that the number of pixel tone levels (N+1) available by the image output unit 200 coincides with the possible number (n+1) of the sum n of the comparison results. The coincidence of these values, however, ascertains smoother reproduction of the tone levels of the image like the example of FIG. 14 discussed above.

Figure 17:
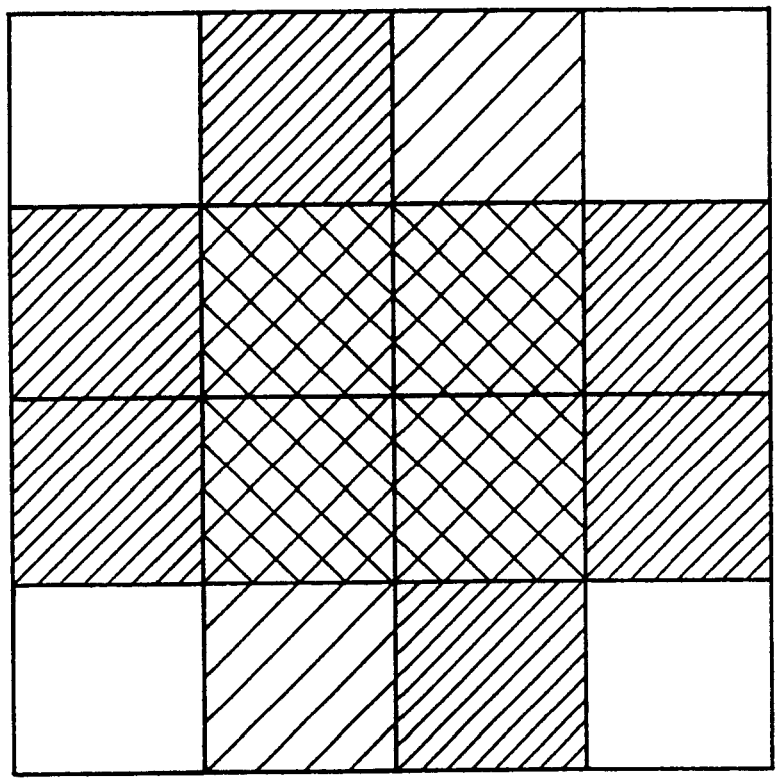
FIG. 17 shows density of each recording pixel in a halftone dot according to the results of FIG. 16B.

FIG. 16A shows a threshold pattern for one halftone dot when the number of divisions M is equal to 6. FIG. 16B shows an example of a halftone dot recorded with this threshold pattern. As shown in FIG. 16A, the area of a substantially square recording pixel PX defined by a bold-line frame is divided into six small divisions DX. One halftone dot area consists of 16 recording pixels PX and thereby includes 96 small divisions DX. In the threshold pattern of FIG. 16A, the threshold values in the range of 0 to 95 are arranged such that they gradually increase from the center of the halftone dot area toward the periphery. In the halftone dot of FIG. 16B, the recording pixels having the sum n of the results of binary comparison with the image signal that is less than 6 are present in the periphery of the recorded halftone dot. FIG. 17 shows the density of each recording pixel included in the halftone dot, which is recorded according to the results of FIG. 16B.

Figure 18:
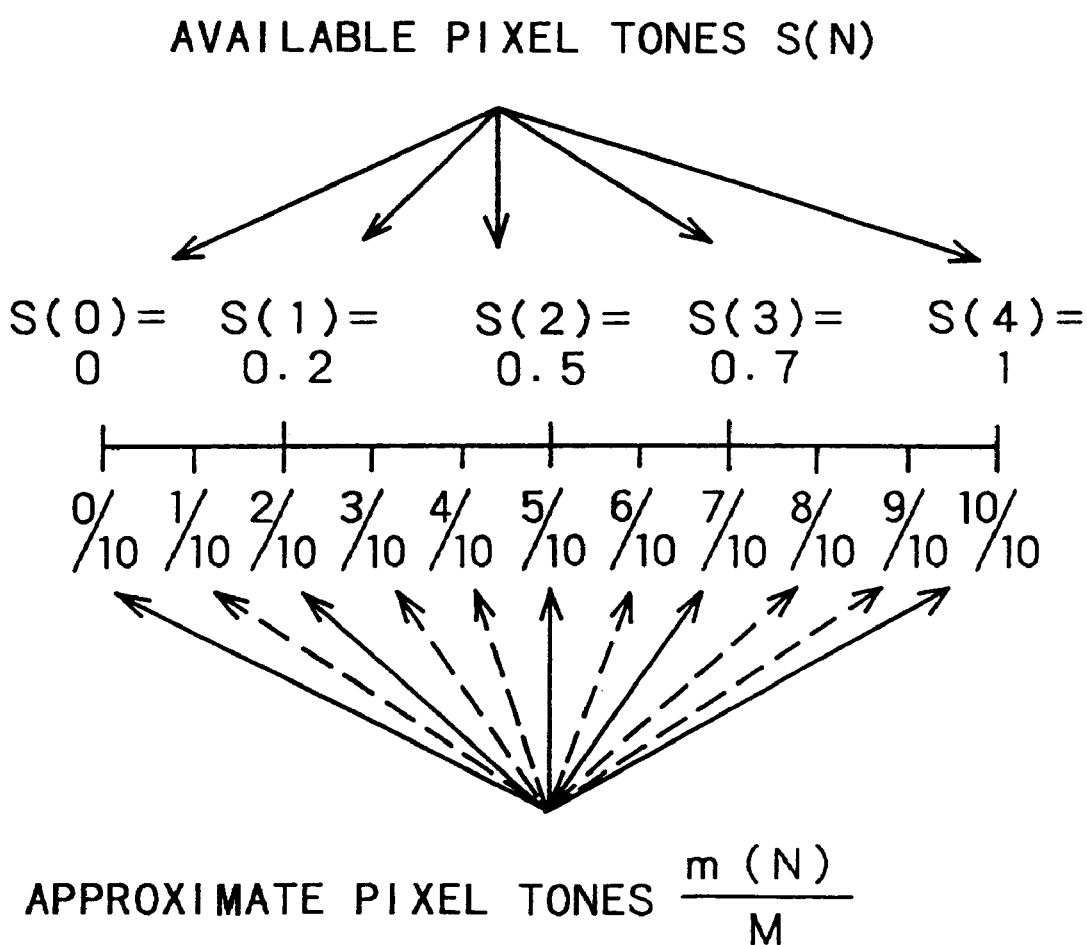
FIG. 18 shows still another example of the relationship between the available pixel tone levels S(N) and the approximate pixel tone levels m(N)/M.

FIG. 18 shows still another example of the relationship between the available pixel tone S(N) and the approximate pixel tone m(N)/M. The following gives the values of the available pixels tone S(N), which depends upon the performance of the image output unit 200, and the difference ΔS between the adjoining pixel tone levels in the example of FIG. 18:

S(0)=0.0;
S(1)=0.2, ΔS=0.2 (=ΔSmin);
S(2)=0.5, ΔS=0.3;
S(3)=0.7, ΔS=0.2 (=ΔSmin); and
S(4)=1.0, ΔS=0.3.

In the example of FIG. 18, the number of divisions M is equal to 10, and the values of the available pixel tone levels S(N) are equal to those of the approximate pixel tone levels m(N)/M. Like this embodiment, it is not necessary that the number of divisions M is the reciprocal of the minimum ΔSmin among the differences ΔS between the available pixel tone levels S(N). The number of divisions M may be selected to make the values of the available pixel tone levels S(N) substantially equal to those of the approximate pixel tone levels m(N)/M (where m(N) denotes integers selected out of the range of 0 to M). In the example of FIG. 18, the number of divisions M (=10) is determined as the reciprocal of the value 0.1, which is the greatest common divisor of the four differences ΔS.

As described above, in the second embodiment, when the available pixel densities are restricted to the discrete (N+1) values in the image output unit 200, the sums n of the binary comparison results are related to the (N+1) pixel densities. The number of divisions M of the recording pixel is selected to make the sums n of the binary comparison results substantially coincident with the approximate pixel tone levels m(N)/M (where m(N) denotes (N+1) integers selected out of the range of 0 to M). These characteristics enable the number of tone levels reproducible by one halftone dot to increase without enhancing the resolution of the recording pixels.

Although Yule-Nielsen's Equation is used in the above embodiments, any equation other than Yule-Nielsen's Equation may be applied to express the relationship between the ratio of the area of the black regions on the recording medium and the density.

Various types of apparatuses other than those of the inkjet type may used for the image output unit 200, such as an exposure type that expose a photosensitive material with light beams. In the image recording apparatus of the exposure type, the density tone of each pixel may be regulated by controlling the quantity of light for exposure. The type of the above embodiments that increases the size and the density of the recording pixel dots by overlaying a large number of ink droplets, however, has the advantage of the relatively simple structure.

Part of the structure realized by the hardware in the above embodiments may be implemented by software, whereas part of the structure realized by the software may be implemented by hardware. By way of example, part of the circuit elements 36 through 64 shown in the lower portion of FIG. 7 may be implemented by software.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of recording a halftone dot image with a plurality of halftone dots each constituted of one or more record pixels utilizing tone reproduction of each pixel, the method comprising the steps of:

providing a unit block including a plurality of record pixels, each record pixel being divided into M pieces of divisions where M is an integer having a value of at least 2;

(a) providing a threshold pattern having threshold values that are assigned respectively to the divisions in the unit block;

(b) comparing a given multi-tone image signal with the threshold values in the threshold pattern to thereby generate an image recording signal for each record pixel, the image recording signal representing one of at least three pixel-density levels for each record pixel, the multi-tone image signal having a common value for the M divisions of the same record pixel; and (c) recording each record pixel with a pixel-density represented by the image recording signal, thereby producing halftone dots constituted of one or more of the recorded pixels to reproduce a halftone dot image, wherein the step (b) comprises the step of:
(i) comparing the threshold values assigned to the M divisions of each pixel with the multi-tone image signal to obtain M pieces of binary comparison results, and generating the image recording signal as a function of a sum of the M pieces of binary comparison results.

2. A method in accordance with claim 1, wherein each pixel is reproducible at (N+1) density levels in an image output device, where N is an integer in the range of 2 to M, wherein each value of the sum ranging from 0 to M is related to one of the (N+1) density levels, and wherein the step (i) comprises the step of converting the sum into the image recording signal representing one of the reproducible density levels for each pixel.

3. A method in accordance with claim 2, wherein the (N+1) reproducible density levels can be related to (N+1) pixel tone levels which are defined to be area rates obtained by converting the (N+1) reproducible density levels into equivalent area rates of recorded portion of one pixel, and wherein the integer M is selected such that values of the (N+1) pixel tone levels are substantially equal to values of m(j)/M, respectively, where j is an integer ranging from 0 to N and where m(j) are (N+1) pieces of different integers in the range of 0 to M.

4. A method in accordance with claim 1, wherein the step (c) comprises the step of reproducing a density level of each pixel by overlaying ink droplets where volume of the ink droplets is controlled by the image recording signal.

5. A method in accordance with claim 1, wherein the step (c) comprises the step of reproducing a density level of each pixel by exposing a recording medium with light where quantity of the light is controlled by the image recording signal.

6. An apparatus for recording a halftone dot image with a plurality of halftone dots each constituted of one or more record pixels utilizing tone reproduction of each record pixel, the apparatus comprising:

a unit block including a plurality of record pixels, each record pixel being divided into M pieces of divisions where M is an integer having a value of at least 2;

a threshold pattern memory which stores a threshold pattern having threshold values that are assigned respectively to the divisions in the unit block;

an image recording signal generator which compares a given multi-tone image signal with the threshold values in the threshold pattern to thereby generate an image recording signal for each record pixel, the image recording signal representing one of at least three pixel-density levels for each record pixel, the multi-tone image signal having a common value for the M divisions of the same record pixel; and a recording unit which records each record pixel with a pixel-density represented by the image recording signal, thereby producing halftone dots constituted of one or more of the recorded pixels to reproduce a halftone dot image, wherein the image recording signal generator comprises a first unit which compares the threshold values assigned to the M divisions of each pixel with the multi-tone image signal to obtain M pieces of binary comparison results, and generates the image recording signal as a function of a sum of the M pieces of binary comparison results.

7. An apparatus in accordance with claim 6, wherein each pixel is reproducible at (N+1) density levels in an image output device, where N is an integer in the range of 2 to M, wherein each value of the sum ranging from 0 to M is related to one of the (N+1) density levels, and wherein the first unit comprises a converter for converting the sum into the image recording signal representing one of the reproducible density levels for each pixel.

8. An apparatus in accordance with claim 7, wherein the (N+1) reproducible density levels can be related to (N+1) pixel tone levels which are defined to be area rates obtained by converting the (N+1) reproducible density levels into equivalent area rates of recorded portion of one pixel, and wherein the integer M is selected such that values of the (N+1) pixel tone levels are substantially equal to values of m(j)/M, respectively, where j is an integer ranging from 0 to N and where m(j) are (N+1) pieces of different integers in the range of 0 to M.

9. An apparatus in accordance with claim 6, wherein the recording unit reproduces a density level of each pixel by overlaying ink droplets where volume of the ink droplets is controlled by the image recording signal.

10. An apparatus in accordance with claim 6, wherein the recording unit reproduces a density level of each pixel by exposing a recording medium with light where quantity of the light is controlled by the image recording signal.

11. A method of generating an image recording signal to record a halftone dot image having a plurality of halftone dots each constituted of one or more record pixels with an image recording device that is capable of producing at least three density levels at each record pixel, the method comprising the steps of:

providing a unit block including a plurality of record pixels, each record pixel being divided into M pieces of divisions where M is an integer having a value of at least 2;

(a) providing a threshold pattern having threshold values that are assigned respectively to the divisions in the unit block; and (b) comparing a given multi-tone image signal with the threshold values in the threshold pattern to thereby generate an image recording signal for each record pixel, the image recording signal representing one of the at least three pixel-density levels for each record pixel, the multi-tone image signal having a common value for the M divisions of the same record pixel;

wherein the step (b) comprises the step of:
(i) comparing the threshold values assigned to the M divisions of each pixel with the multi-tone image signal to obtain M pieces of binary comparison results, and generating the image recording signal as a function of a sum of the M pieces of binary comparison results.

12. A method in accordance with claim 11, wherein each pixel is reproducible at (N+1) density levels in an image output device, where N is an integer in the range of 2 to M, wherein each value of the sum ranging from 0 to M is related to one of the (N+1) density levels, and wherein the step (i) comprises the step of converting the sum into the image recording signal representing one of the reproducible density levels for each pixel.

13. A method in accordance with claim 12, wherein the (N+1) reproducible density levels can be related to (N+1) pixel tone levels which are defined to be area rates obtained by converting the (N+1) reproducible density levels into equivalent area rates of recorded portion of one pixel, and wherein the integer M is selected such that values of the (N+1) pixel tone levels are substantially equal to values of m(j)/M, respectively, where j is an integer ranging from 0 to N and where m(j) are (N+1) pieces of different integers in the range of 0 to M.

14. An apparatus for generating an image recording signal to record a halftone dot image having a plurality of halftone dots each constituted of one or more record pixels with an image recording device that is capable of producing at least three density levels at each record pixel, the apparatus comprising:

a unit block including a plurality of record pixels, each record pixel being divided into M pieces of divisions where M is an integer having a value of at least 2;

a threshold pattern memory which stores a threshold pattern having threshold values that are assigned respectively to the divisions in the unit block; and an image recording signal generator which compares a given multi-tone image signal with the threshold values in the threshold pattern to thereby generate an image recording signal for each record pixel, the image recording signal representing one of the at least three pixel-density levels for each record pixel, the multi-tone image signal having a common value for the M divisions of the same record pixel;

wherein the image recording signal generator comprises a first unit which compares the threshold values assigned to the M divisions of each pixel with the multi-tone image signal to obtain M pieces of binary comparison results, and generating the image recording signal as a function of a sum of the M pieces of binary comparison results.

15. An apparatus in accordance with claim 14, wherein each pixel is reproducible at (N+1) density levels in an image output device, where N is an integer in the range of 2 to M, wherein each value of the sum ranging from 0 to M is related to one of the (N+1) density levels, and wherein the first unit comprises a converter for converting the sum into the image recording signal representing one of the reproducible density levels for each pixel.

16. An apparatus in accordance with claim 15, wherein the (N+1) reproducible density levels can be related to (N+1) pixel tone levels which are defined to be area rates obtained by converting the (N+1) reproducible density levels into equivalent area rates of recorded portion of one pixel, and wherein the integer M is selected such that values of the (N+1) pixel tone levels are substantially equal to values of m(j)/M, respectively, where j is an integer ranging from 0 to N and where m(j) are (N+1) pieces of different integers in the range of 0 to M.

\* \* \* \* \*